(No Model.)

H. C. BENDER & H. C. BRUNER.
LAWN MOWER.

No. 256,537. Patented Apr. 18, 1882.

Attest:
Davis
L. J. Matos

Inventors:
Henry C. Bender
Hiram C. Bruner
By their atty.

UNITED STATES PATENT OFFICE.

HENRY C. BENDER, OF MONTGOMERYVILLE, AND HIRAM C. BRUNER, OF LANSDALE, PENNSYLVANIA.

LAWN-MOWER.

SPECIFICATION forming part of Letters Patent No. 256,537, dated April 18, 1882.

Application filed December 1, 1881. (No model.)

*To all whom it may concern:*

Be it known that we, HENRY C. BENDER, of Montgomeryville, and HIRAM C. BRUNER, of Lansdale, both in the county of Montgomery and State of Pennsylvania, have invented an Improvement in Lawn-Mowers, of which the following is a specification.

Our invention has reference to lawn-mowers; and it consists in two serrated knives or cutters arranged to move in opposite directions at the same time, and suitable mechanism to operate them; further, in arranging the cutters in front of the driving mechanism and constructing the same in such a manner that the machine will cut up close to a hedge or fence or around a tree; further, in combining said cutters and the frame with suitable mechanism to adjust the height of the cutters from the ground; and, finally, in many details of construction, all of which are more fully set forth in the following specification and shown in the accompanying drawings, which form part thereof.

The object of our invention is to so construct a machine that it shall weigh about one-half as much only as the common revolving cutter lawn-mowers and yet perform the same duty, thereby lessening the actual work of the operator and enabling him to cut a greater area of grass in a given time; further, in so constructing the machine that the driving-wheel is arranged behind the cutters, enabling the machine to cut up close to any object; and, finally, to simplify and cheapen the construction of lawn-mowers generally.

Figure 1:
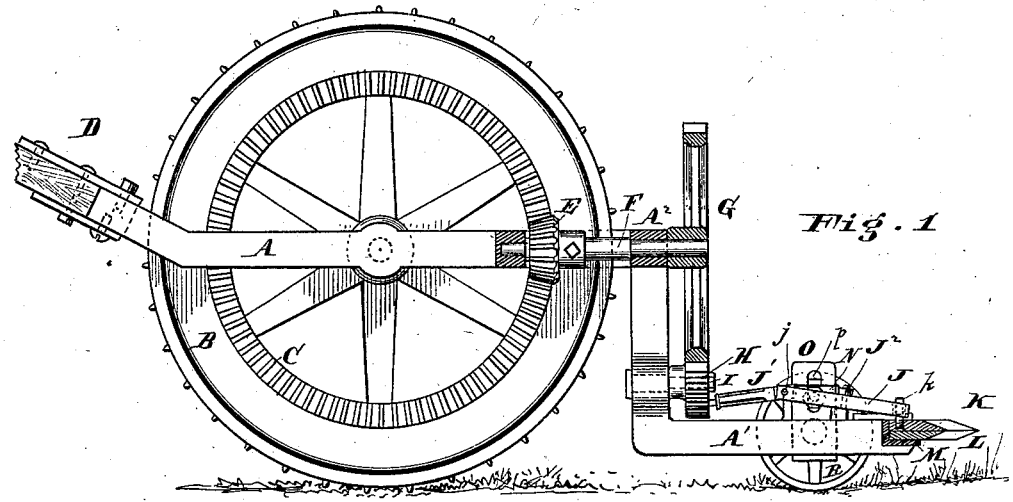
Figure 2:
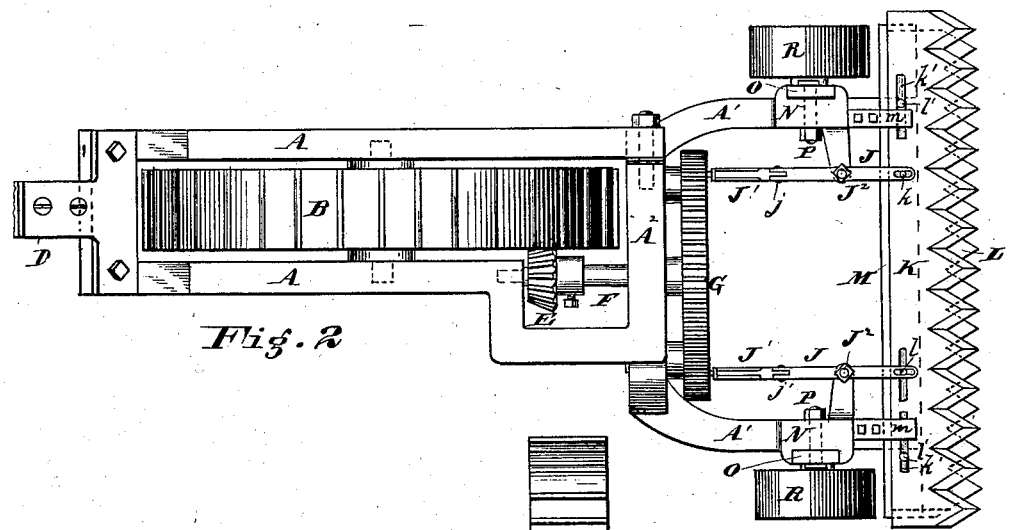
Figure 3:
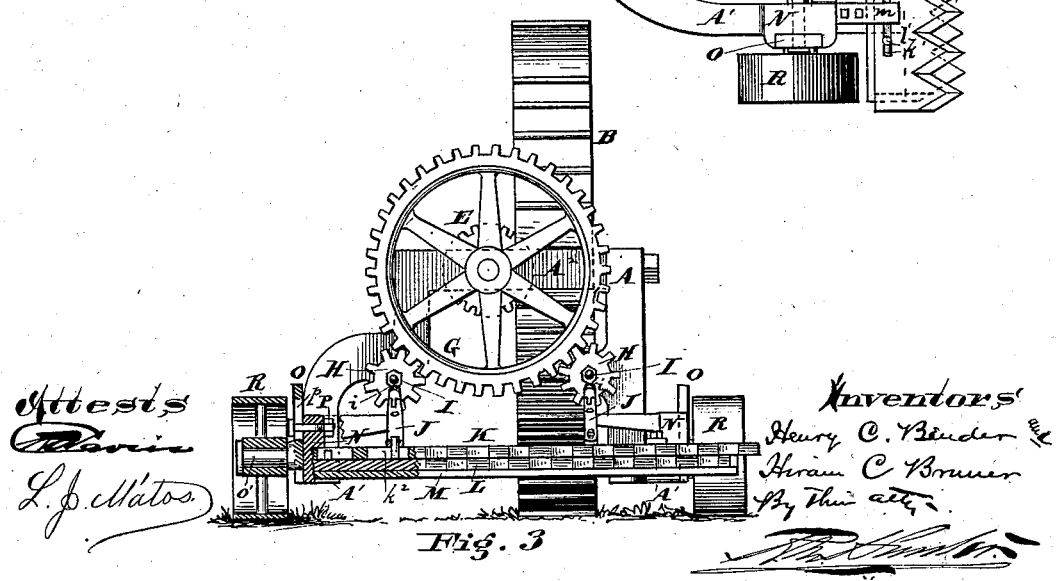

In the drawings, Figure 1 is a side sectional elevation of our improved lawn-mower. Fig. 2 is a plan of same, and Fig. 3 is an end elevation of same with part in section.

A is the frame, and is made of malleable-iron casting in the peculiar shape shown.

D is the handle, the lower part of which alone is shown.

B is the driving-wheel, and is pivoted to the frame A, as shown, said frame being sprung open to take in the axle of said driving-wheel.

C is a crown or bevel gear wheel secured to or forming part of wheel B, and revolving with it.

E is a small pinion or bevel wheel which meshes with the wheel C, and is secured to a shaft, F, journaled in the frame A A², and carrying on its forward end a spur-wheel, G.

Secured to the frame by bolts I, below and on either side of the spur-wheel G, are pinions H, having holes $i$, in which the ends of the pivoted arms J' work. The arms J' are pivoted at $j$ to levers J, pivoted to frame A' at J², and provided on their ends with slots, through which the pins $k$ and $l$ work, said pins being secured respectively to the cutter-bars K and L. These cutter-bars are arranged one upon the other, and are arranged to move in opposite directions at the same time. They are kept in position by the L guide-plate M, secured to frame A', and by pins $l'$, secured to knife-bar L, working through slots $k'$ in knife-bar K, and the knife-bars are kept down upon the plate M by fingers or plates $m$. The supporting-wheels R are journaled on axle-pins O', (see Fig. 3,) secured to uprights O, which are provided with slots $p$. These uprights are made adjustable in supports N, forming part of frame A', by bolts P.

The operation is as follows: Upon pushing the mower forward the driving-wheel B is rotated and causes the spur-wheel G to rotate rapidly. This wheel in turn rotates the pinions very rapidly, and they, through the agency of the arms J' and levers J, reciprocate the knife bars K and L in opposite directions at the same time and with considerable rapidity. If it is desired to move the machine without cutting, it can be run upon wheels R R.

Having now described our invention, what we claim as new, and desire to secure by Letters Patent, is—

1. In a lawn-mower, a light open frame adapted to be sprung open to receive the driving-wheel and its axle between its sides, and provided with means to secure the two sides rigidly together at their free ends, so as to inclose the driving-wheel in a rigid frame, said frame being mounted upon three wheels, one being a large driving-wheel in the rear and the others being two small adjustable wheels in front, in combination with said wheels, means to adjust the front wheels, a revolving spur-wheel driven by the large driving-wheel, two pinions driven by said spur-wheel and revolving in the same direction, two oppositely-reciprocating cutters, an L frame or bar to support said cutters, and levers to connect said cutters respectively to their respective pinions, substantially as and for the purpose specified.

2. In a lawn-mower, a light open frame adapted to be sprung open to receive the driving-wheel and its axle between its sides, and a stud or arm secured to one side, and means to secure the free end of said arm to the other side to inclose the driving-wheel in a rigid frame, all as shown and described.

3. In a lawn-mower, the combination of a frame carrying the driving-wheel B, with its gear-wheel C, bevel-pinion E, shaft F, spur-wheel G, the two pinions H, rotating in the same direction, arms J', levers J, and knife-bars K and L, substantially as and for the purpose specified.

4. In a lawn-mower, the combination of a frame carrying the driving-wheel B, with its gear-wheel C, bevel-pinion E, shaft F, spur-wheel G, the two pinions H, rotating in the same direction, arms J', levers J, knife-bars K and L, and guide-rollers R, substantially as and for the purpose specified.

5. In a lawn-mower, the spur-wheel G, pinions H, pivoted arms J', levers J, provided on the ends with slots, knife-bars K and L, respectively provided with slots $k$ and pins $l$, plate M, frame A', and plates $m$, substantially as and for the purpose specified.

In testimony of which invention we hereunto set our hands.

HENRY C. BENDER.
HIRAM C. BRUNER.

Witnesses:
SYL. JENKINS,
O. M. EVANS.